United States Patent
Guo et al.

(10) Patent No.: US 10,673,032 B2
(45) Date of Patent: Jun. 2, 2020

(54) POWER BATTERY TOP CAP STRUCTURE, POWER BATTERY AND BATTERY MODULE

(71) Applicant: Contemporary Amperex Technology Co., Limited, Ningde, Fujian (CN)

(72) Inventors: Zhijun Guo, Ningde (CN); Peng Wang, Ningde (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 28 days.

(21) Appl. No.: 15/887,112

(22) Filed: Feb. 2, 2018

(65) Prior Publication Data

US 2018/0233714 A1   Aug. 16, 2018

(30) Foreign Application Priority Data

Feb. 13, 2017   (CN) .......................... 2017 1 0075441

(51) Int. Cl.
  *H01M 2/30*   (2006.01)
  *H01M 2/04*   (2006.01)
  (Continued)

(52) U.S. Cl.
  CPC ......... *H01M 2/043* (2013.01); *H01M 2/0456* (2013.01); *H01M 2/0478* (2013.01);
  (Continued)

(58) Field of Classification Search
  CPC ............................... H01M 2/30; H01M 2/043
  See application file for complete search history.

(56) References Cited

U.S. PATENT DOCUMENTS

| | | | | |
|---|---|---|---|---|
| 2014/0227567 | A1* | 8/2014 | Han | H01M 2/1077 |
| | | | | 429/61 |
| 2015/0132619 | A1* | 5/2015 | He | H01M 2/043 |
| | | | | 429/53 |
| 2015/0364731 | A1 | 12/2015 | Yoo et al. | |

FOREIGN PATENT DOCUMENTS

| | | |
|---|---|---|
| CN | 105576160 A | 5/2016 |
| CN | 106299172 A | 1/2017 |

(Continued)

OTHER PUBLICATIONS

Extended European Search Report received in corresponding European Application No. 18275015 dated May 14, 2018.

*Primary Examiner* — Olatunji A Godo
(74) *Attorney, Agent, or Firm* — Arent Fox LLP

(57) ABSTRACT

A top cap structure for a power battery includes a first electrode assembly and a top cap piece. The first electrode assembly includes a first electrode column and a first connection block. The first connection block includes a main body and a compound portion that are bonded together. A base metal material of the main body is different from the base metal materials of the first electrode column and the compound portion. The compound portion includes a first connection hole and the main body includes a second connection hole. A top portion of the first electrode column includes a connection section. The connection section passes through the top cap piece, the second connection hole, and the first connection hole, and extends from the first connection hole. The connection section and the compound portion are welded together. The connection section is riveted to the second connection hole.

16 Claims, 5 Drawing Sheets

(51) Int. Cl.
*H01M 2/06* (2006.01)
*H01M 2/26* (2006.01)
*H01M 2/20* (2006.01)
*H01M 2/22* (2006.01)

(52) U.S. Cl.
CPC ............ *H01M 2/06* (2013.01); *H01M 2/202* (2013.01); *H01M 2/22* (2013.01); *H01M 2/26* (2013.01); *H01M 2/30* (2013.01); *H01M 2220/20* (2013.01)

(56) References Cited

FOREIGN PATENT DOCUMENTS

| | | |
|---|---|---|
| EP | 2500964 A2 | 9/2012 |
| JP | 2006212659 A | 8/2006 |

* cited by examiner

POWER BATTERY TOP CAP STRUCTURE, POWER BATTERY AND BATTERY MODULE

CROSS-REFERENCE TO RELATED APPLICATION(S)

This application claims the benefit of Chinese Patent Application No. CN201710075441.1, entitled "POWER BATTERY TOP CAP STRUCTURE, POWER BATTERY AND BATTERY MODULE" and filed on Feb. 13, 2017 in the State Intellectual Property Office of the People's Republic of China (PRC) (SIPO), the disclosure of which is expressly incorporated by reference herein in its entirety.

BACKGROUND

Field

The present application relates to the technical field of energy storage devices, and particularly relates to a power battery top cap structure, a power battery and a battery module.

Background

In a non-aqueous electrolyte secondary battery, the material that forms the electrode column of positive electrode is preferably aluminum or an aluminum alloy that is not soluble in a non-aqueous electrolyte. On the other hand, the material that forms the electrode column of negative electrode is typically copper or another metal that does not form an alloy with the negative active material.

When forming a power battery group, a busbar needs to be welded onto a connection block of the positive electrode or a connection block of the negative electrode to connect the batteries in the group. However, because the busbar is typically formed by a single material (such as aluminum or copper), and the melting point of aluminum is lower than that of copper, and because the specific heat capacity of aluminum is higher than that of copper, it is very difficult to weld a copper material and an aluminum material together by way of ultrasonic welding, laser welding, and the like. Accordingly, the connection blocks of the positive electrode and the negative electrode within the top cap structure of a power battery need to be formed with the same material as that used to form the busbar. That is to say, it is necessary that the connection blocks of both the positive electrode and the negative electrode are formed by an aluminum material, or that both are formed by a copper material. As a result, when the positive electrode column is formed by an aluminum material, and the negative electrode column is formed by a copper material, a structure is used to transition between copper and aluminum to enable both connection blocks outside the bare battery core to be formed by an aluminum material, or to be formed by a copper material.

SUMMARY

The present application provides a power battery top cap structure.

A first embodiment of the present application provides a power battery top cap structure, which includes a first electrode assembly and a top cap piece. The first electrode assembly includes a first electrode column and a first connection block. A top portion of the first electrode column includes a connection section. The first connection block includes a main body and a compound portion. A material forming the main body includes a first base metal. In addition, both a material forming the first electrode column and a material forming the compound portion include a second base metal, and the first base metal is different from the second base metal. The compound portion is bonded with the main body, and the compound portion includes a first connection hole. The first connection block is disposed above the top cap piece. The connection section and the compound portion are welded together. An upper surface of the main body includes a recessive portion. The compound portion is inserted within the recessive portion. The main body further comprises a second connection hole. The connection section passes through the top cap piece, the second connection hole, and the first connection hole, and further extends from the first connection hole. The connection section is rivetedly connected to the second connection hole.

Preferably, the second connection hole includes a step portion therein, and the first electrode column is tightly engaged with the step portion. Preferably, a diameter of a top portion of the second connection hole is equal to a diameter of the first connection hole, and a periphery of the connection section is welded to the inner wall of the first connection hole. Preferably, a ratio of the thickness of the compound portion to the thickness of the main body ranges from $1/10$ to $2/3$. Preferably, an upper surface of the compound portion is lower than an upper surface of the main body. Preferably, a top surface of the connection section is flush with the upper surface of the compound portion. Preferably, the compound portion extends along a direction of a width of the top cap piece, and extends through the thickness of the main body. Preferably, the material forming the main body is aluminum or an aluminum alloy, the material forming the first electrode column is copper or a copper alloy, and the material forming the compound portion is copper or a copper alloy; or the material forming the main body is copper or a copper alloy, a material forming the first electrode column is aluminum or an aluminum alloy, and a material forming the compound portion is aluminum or an aluminum alloy. Preferably, the connection section and the compound portion are connected via laser welding.

Preferably, the main body and the compound portion are bonded together by at least one of a cold rolling process, a hot rolling process, an explosive compound process and an explosive rolling process. Preferably, the power battery top cap structure includes a second electrode assembly that is attached to the top cap piece.

A second embodiment of the present application provides a power battery, which includes the foregoing power battery top cap structure and a second electrode assembly that is attached to the top cap piece. Preferably, the power battery includes a second electrode assembly that is attached to the top cap piece.

A third embodiment of the present application provides a battery module, which includes a busbar and the foregoing power battery. The busbar is welded to the main body, and both the material forming the busbar and the material forming the main body include the first base metal. Preferably, the battery module includes a second electrode assembly that is attached to the top cap piece.

Embodiments of the present application provide a power battery top cap structure, a power battery, and a battery module that may effectively avoid the fluctuations in the contact electrical resistance on the copper aluminum transition interface caused by shaking, impacting and other external factors.

It is to be understood that both the foregoing general description and the following detailed description are for descriptive purposes only, and are not intended to limit the scope of the present application.

DESCRIPTION OF ELEMENT SYMBOLS

Figure 1:
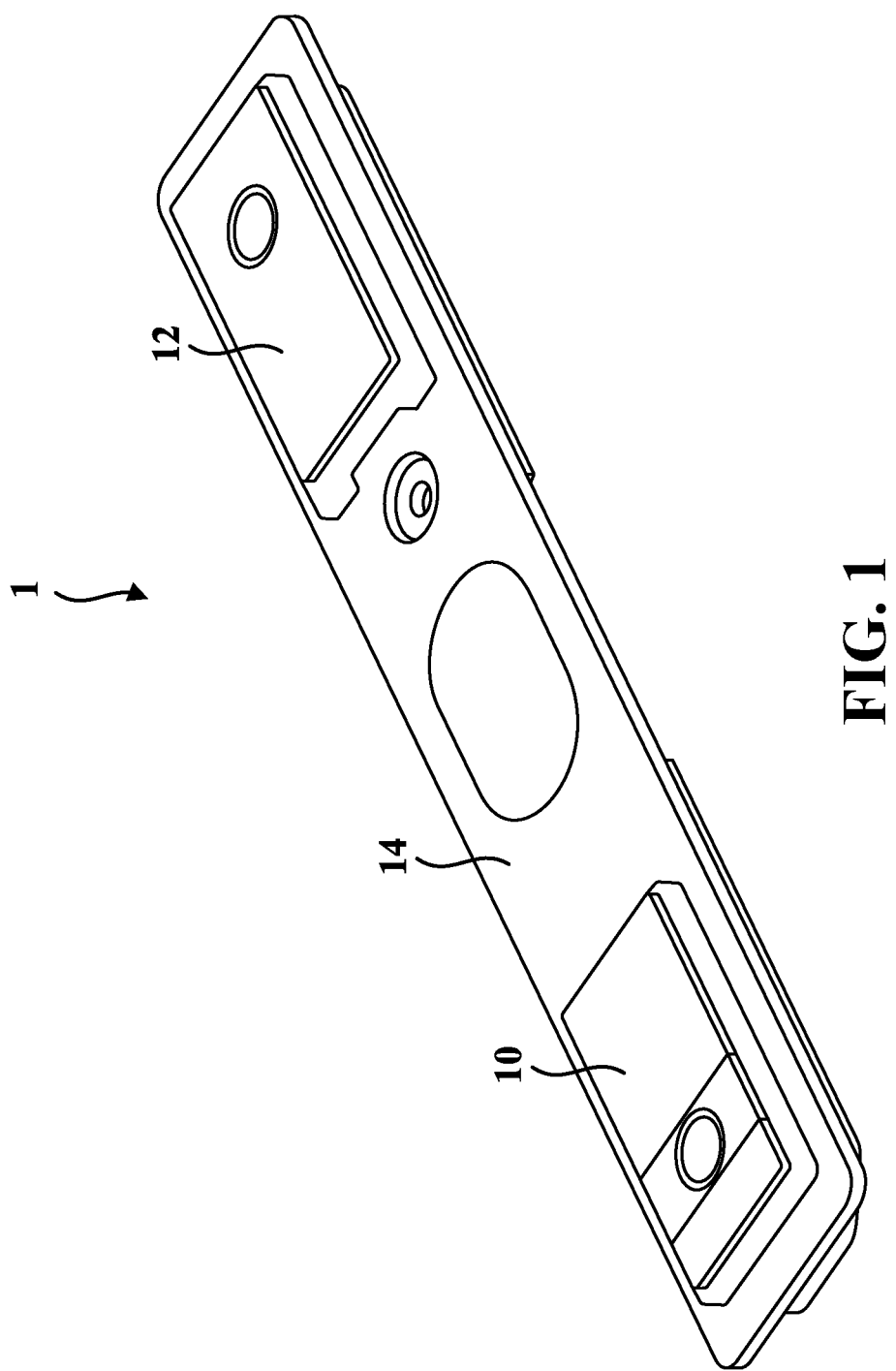
FIG. 1 is a schematic view of the overall structure of the power battery top cap structure provided in an embodiment of the present application.

10—first electrode assembly; 100—first electrode column; 1000—connection section; 102—first seal member; 104—first connection block; 1040—main body; 1040a—second connection hole; 1040b—step portion; 1042—compound portion; 1042a—first connection hole; 106—first upper insulation member; 108—first lower insulation member; 12—second electrode assembly; 120—second electrode column; 122—second seal member; 124—second connection block; 126—second upper insulation member; 128—second lower insulation member; and 14—top cap piece.

The drawings as described above are incorporated into the Detailed Description to constitute a part of the Detailed Description of the present application. The drawings show one or more embodiments according to the present application, and are used along with the Detailed Description for describing the mechanism of the present application.

DETAILED DESCRIPTION

The present application will be further described in details in reference to specific exemplary embodiments and accompanying drawings. The terms "front," "rear," "left," "right," "top" and "low" are used in the present application with the respective power battery top cap structure shown in the drawings of the present application.

In a power battery top cap structure, the electrode column may have a copper aluminum structure (that is, the upper part of an electrode column may be formed by copper, and the lower part of the same electrode column may be formed by aluminum; alternatively, the upper part of an electrode column may be formed by aluminum, and the lower part of the same electrode column may be formed by copper) by friction welding or riveting. However, due to structural characteristics of the riveting interface and variability in the riveting process, there may be fluctuation in the contact electrical resistance at the riveting interface between copper and aluminum when the battery is subject to shaking, impacting and other external factors during use. Such fluctuation may prevent the power battery from outputting a stable current. The increase in the contact electrical resistance may also lead to increased heat generation on the copper aluminum interface.

An embodiment of the present application provides a power battery top cap structure, which is installed in the top portion of a power battery. The power battery includes a shell body and a bare battery core. The shell body has an opening thereon. The bare battery core includes a positive electrode piece, a negative electrode piece, and a diaphragm between the positive electrode piece and the negative electrode piece. The bare battery core is accommodated within the shell body. The power battery top cap structure seals the opening on the top portion of the shell body. The electric power stored in the power battery is output to an external device. Typically, the power battery needs to be used as part of a battery group. In particular, a plurality of power batteries is connected together via a busbar serially or in parallel, so as to form a battery group.

As shown in FIG. 1, the power battery top cap structure 1 provided in an embodiment of the present application includes a first electrode assembly 10, a second electrode assembly 12, and a top cap piece 14. Each of the first electrode assembly 10 and the second electrode assembly 12 is electrically connected to one of the positive and negative electrodes of the power battery. That is to say, the first electrode assembly 10 may be electrically connected to either the positive electrode of the power battery or the negative electrode of the power battery. In the following embodiment, the first electrode assembly 10 is electrically connected to the positive electrode of the power battery, while the second electrode assembly 12 is electrically connected to the negative electrode of the power battery.

Figure 2:
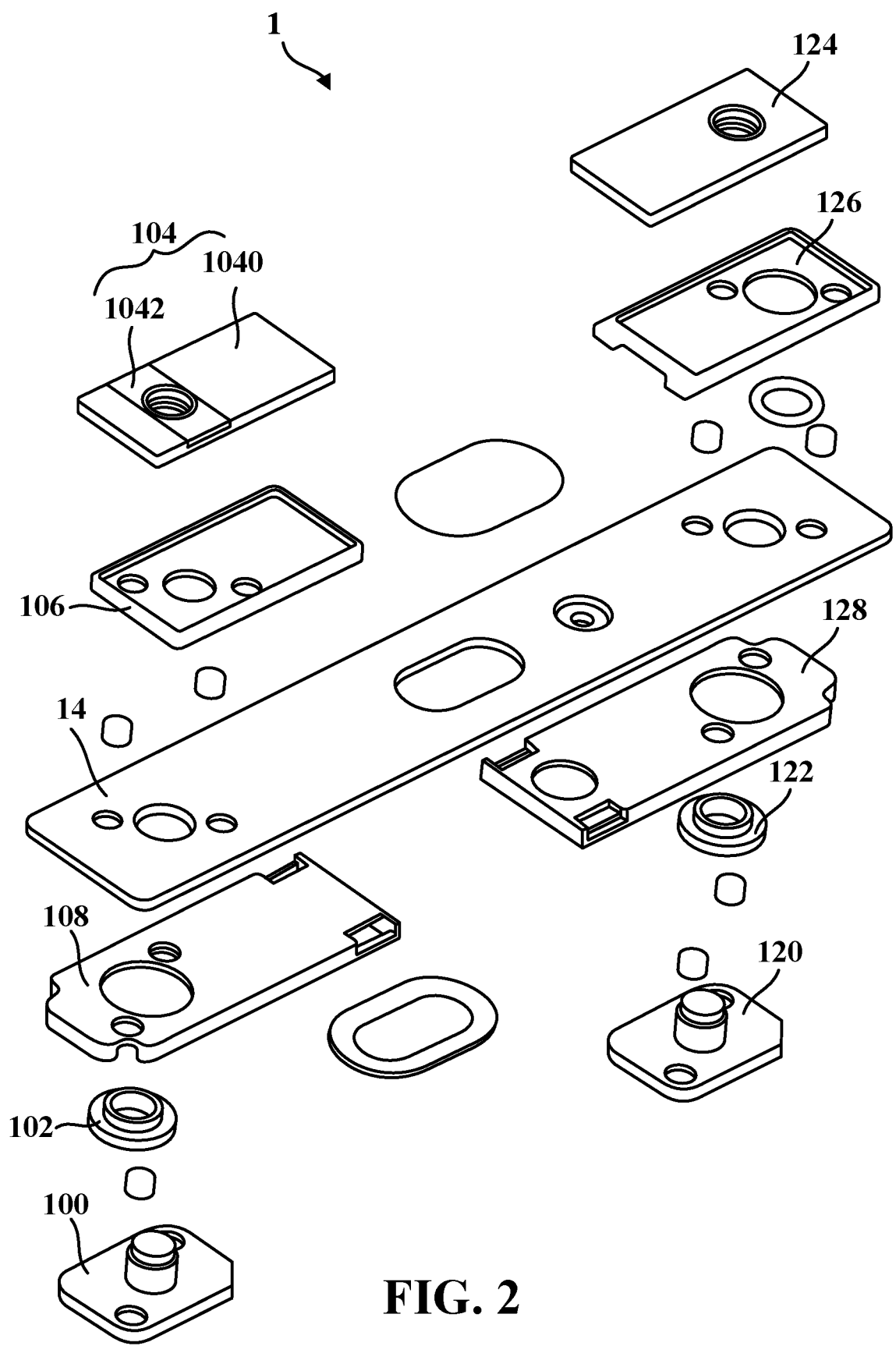
FIG. 2 is a schematic exploded view of the power battery top cap structure provided in an embodiment of the present application.
Figure 3:
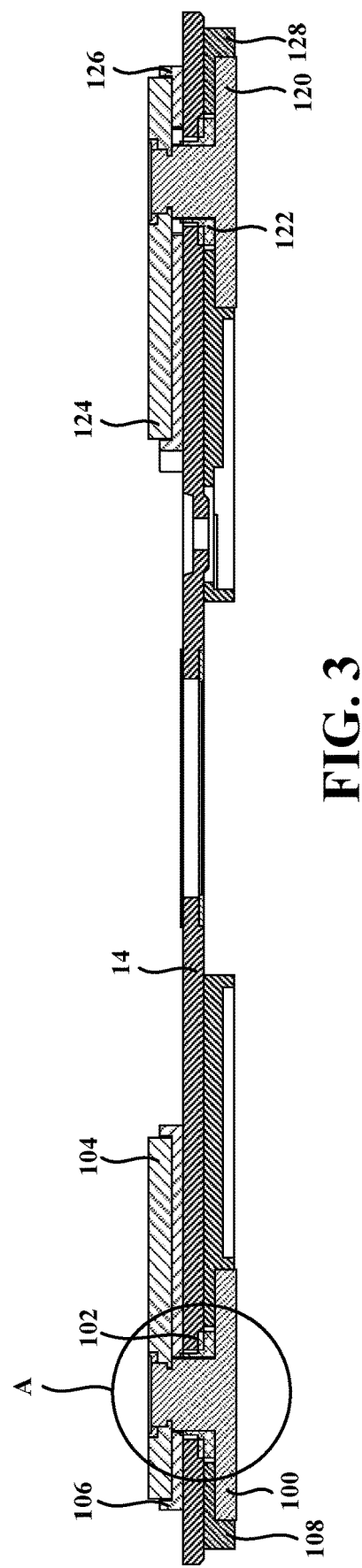
FIG. 3 is a schematic cross sectional view of the power battery top cap structure provided in an embodiment of the present application.

As shown in FIGS. 2 and 3, the first electrode assembly 10 includes a first electrode column 100, a first seal member 102, a first connection block 104, a first upper insulation member 106, and a first lower insulation member 108, and so on. The second electrode assembly 12 includes a second electrode column 120, a second seal member 122, a second connection block 124, a second upper insulation member 126, and a second lower insulation member 128, and so on.

In order to connect the busbar with the first connection block 104 and the second connection block 124 through laser welding, the respective areas on the first connection block 104 and the second connection block 124 for connecting with the busbar are formed by the same material as that of the busbar (for example, they are all formed by a copper material, or they are all formed by an aluminum material). It is noted that as used here, when two or more elements are described as being formed by the same material, it refers to these elements having the same base metal (the major metal component forming an alloy is called the base metal). For example, when the material forming the first connection block 104 is a pure aluminum material, or an alloy of aluminum manganese, the material forming the second connection block 124 may be a pure aluminum material, or an alloy of aluminum manganese, or an alloy of aluminum silicon, or an alloy of aluminum magnesium, etc., as long as their base metal is aluminum. In an embodiment, the positive electrode column (that is, the first electrode column 100 in an embodiment of the present application) of a power battery has aluminum as its base metal, while the negative electrode column (that is, the second electrode column 120 in an embodiment of the present application) of a power battery has copper as its base metal. In an embodiment in which the base metal of the first connection block 104, the second connection block 124, and the busbar have copper as their base metal, since both the second electrode column 120 and the second connection block 124 have copper as their base metal, the negative electrode in this case does not need a copper aluminum interface. On the other hand, since the areas on the first connection block 104 for connecting with the busbar have copper as their base metal, the first electrode assembly 10 has an interface to transition from the aluminum base metal of the positive electrode to the copper base metal of the first connection block 104. The specific assembly process will be provided in detail below.

As shown in FIG. 2, in this embodiment of the present application, the material forming the first electrode column 100 is aluminum or an aluminum alloy. In particular, the first electrode column 100 does not have a copper aluminum interface. On the other hand, the first connection block 104 may be used for the copper aluminum interface. The first connection block 104 has a main body 1040 and a compound portion 1042. The main body 1040 is the main structure of the first connection block 104. In addition, the main body is used for welding with the busbar. Hence, the material forming the main body 1040 is copper or a copper alloy. At the same time, the material forming the compound portion 1042 is aluminum or an aluminum alloy, which may be connected with the first electrode column 100 by welding. Since a welded joint surface is formed by welding the compound portion 1042 to the first electrode column 100, a stable power transmission surface is formed, thus avoiding fluctuation in the contact electrical resistance associated with a riveting surface caused by an external shaking or impacting force. The compound portion 1042 is bonded with the main body 1040 in a bonding process. After the bonding process, a bonded interface is formed between the two. The bonded interface is a metallurgical bond (a type of bond formed when the atoms of two metals on the bonding surfaces diffuse into each other to form an interface). The rate of bonding at the bonded interface between the main body 1040 and the compound portion 1042 typically cannot be lower than 90%, and ideally the rate should reach 100%. Moreover, preferably, the tensile strength of the bonded interface between the compound portion 1042 and the main body 1040 is greater than either the tensile strength of the main body 1040 or the tensile strength of the compound portion 1042. Accordingly, the bonded interface between the compound portion 1042 and the main body 1040 may form a stable power transmission surface, and the two bonding surfaces will not slide against each other to cause fluctuation in the contact electrical resistance when there is an external shaking or impacting force.

Because the compound portion 1042 and the main body 1040 are formed by different materials, they cannot be securely bonded together by laser welding, and accordingly a special processing technique is needed. However, none of the available special processing techniques may be easily carried out during the assembly process of the power battery top cap structure. As a result, the bonding process to bond the compound portion 1042 and the main body 1040 may be carried out in a process prior to the assembly.

In related technologies, one approach may be to have a copper aluminum interface on the first electrode column 100. However, due to the structural limitation of the first electrode column 100, a more complex approach may have to be employed, such as by a friction welding process. Moreover, such a bonding process may only be carried out one by one, and thus is not suitable for large scale production. In addition, because parts such as the first seal member 102 are used to secure and seal the connection between the first electrode column 100 and the first connection block 104, when the copper aluminum interface surface of the first electrode column 100 is broken, the first seal member 102 may fall off, thereby causing the power battery top cap structure 1 to lose its sealing function and causing battery leakage.

With respect to the first electrode column 100, the first connection block 104 may be in a plate or flake shape. Hence, the first connection block 104 may be formed by a bonding process such as a cold rolling process, a hot rolling process, an explosive bonding process, an explosive rolling process, or other simpler processes.

The compound portion 1042 may be bonded with the main body 1040 to form a bonded interface by one of the following approaches.

Figure 4:
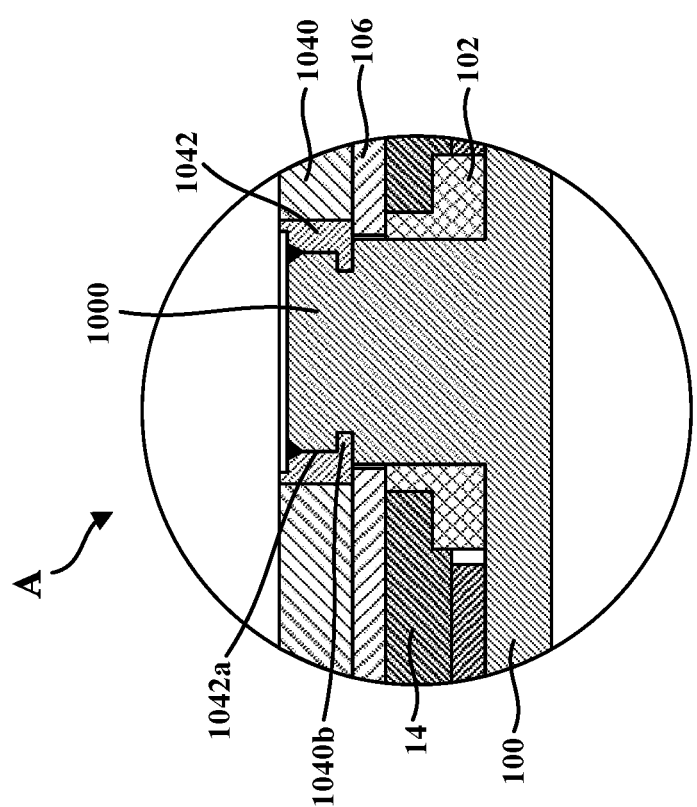
FIG. 4 is a partial enlarged view of part A shown in FIG. 3 when the main body and the compound portion of the power battery top cap structure provided in an embodiment of the present application adopt the first bonding approach.

In the first approach, the compound portion 1042 is disposed through the main body 1040 from the upper surface of the main body, and the bonding process is carried out between the side wall of the compound portion 1042 and the main body 1040 (see FIG. 4).

Figure 5:
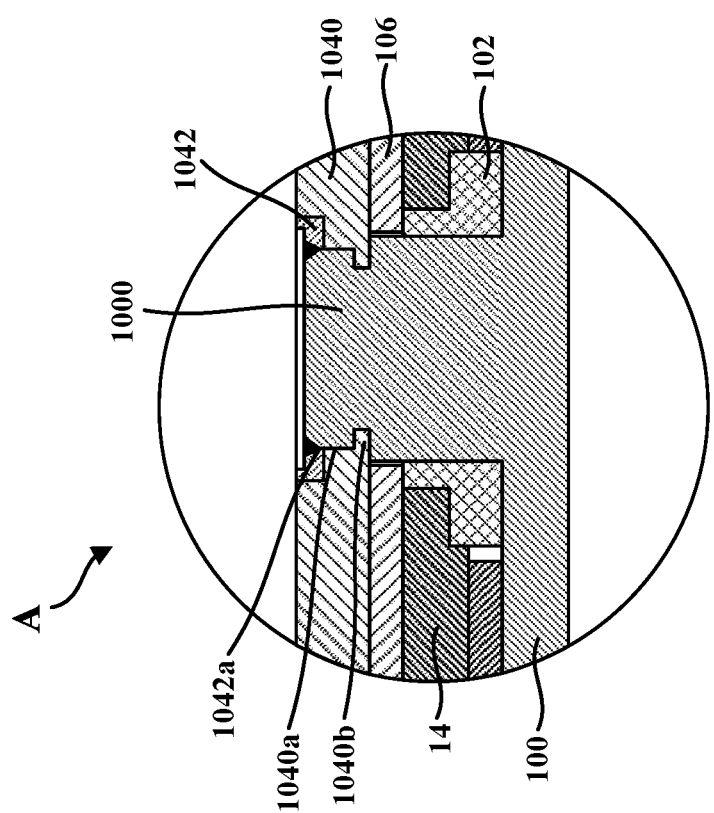
FIG. 5 is a partial enlarged view of part A shown in FIG. 3 when the main body and the compound portion of the power battery top cap structure provided in an embodiment of the present application adopt the second bonding approach.

In the second approach, the compound portion 1042 is disposed on the upper surface of the main body 1040, and the bonding process is carried out between the bottom surface of the compound portion 1042 and the main body 1040. In addition, in this process, in order to enhance the bonding between the compound portion 1042 and the main body 1040, a recessive portion (not identified with a numerical identifier in the figures) may be further provided on the upper surface of the main body 1040. As a result, the compound portion 1042 may be inserted into the recessive portion of the main body 1040 (see FIG. 5). In this way, three side surfaces of the compound portion 1042 may be involved in the bonding process with the main body 1040, further increasing the surface area of the bonded interface.

In order to increase processing efficiency, in each of the two bonding approaches mentioned above, the compound portion 1042 may extend along a direction perpendicular to the thickness of the top cap piece 14, e.g., along the direction of the width of the top cap piece 14 until reaching the two side edges of the main body 1040. Accordingly, in a bonding process, the bonding surface may extend along the direction of the compound portion 1042 for a considerably long distance. Subsequently, the bonded product may be cut into many single pieces for the first connection block 104. In this ways, a single bonding process may be used to generate a batch of products. Typically, two neighboring power batteries are arranged along the direction of the width of the top cap piece 14. As a result, in order to facilitate the connection of the busbar, preferably, a through groove may also extend along the direction of the width of the top cap piece 14, such that more room may be saved for connecting the busbar.

In the first bonding approach mentioned above, as shown in FIG. 4, the compound portion 1042 may be further provided with a first connection hole 1042a, and the top portion of the first electrode column 100 includes a connection section 1000. In an assembly process, the first seal member 102 and the first lower insulation member 108 are disposed between the first electrode column 100 and the lower surface of the top cap piece 14; while the first upper insulation member 106 is disposed between the first connection block 104 and the upper surface of the top cap piece 14. The connection section 1000 of the first electrode column 100 passes from the bottom side through the first seal member 102, the top cap piece 14, and the first upper insulation member 106, and then extends into the first connection hole 1042a. Subsequently, the compound portion 1042 may be welded to the connection section 1000 by a process such as a laser welding process or a supersonic welding process, thus ensuring that a stable power transmission surface with enhanced bonding strength is formed between the first electrode column 100 and the first connection block 104.

In the second bonding approach mentioned above, as shown in FIG. 5, in addition to the first connection hole 1042*a* provided on the compound portion 1042, the main body 1040 is further provided with a second connection hole 1040*a*. The second connection hole 1040*a* is arranged to oppose the first connection hole 1042*a*. In an assembly process, the arrangement of the first seal member 102, the first upper insulation member 106 and the first lower insulation member 108 is maintained the same as in the first bonding approach. The connection section 1000 of the first electrode column 100 passes from the bottom side through the first seal member 102, the top cap piece 14, the first upper insulation member 106, and the second connection hole 1040*a*, and is welded to the first connection hole 1042*a* of the compound portion 1042.

In the second bonding approach, if the compound portion 1042 is too thin, the strength of the welded joint between the connection section 1000 and the compound portion 1042 may be decreased. On the other hand, if the compound portion 1042 is too thick, it may decrease the intrinsic strength of the main body 1040 (in particular the area around the second connection hole 1040*a*). Such decrease in the strength of the main body 1040 may present a potential risk for the connection between the first connection block 104 and the busbar. In this regard, the ratio of the thickness of the compound portion 1042 to the thickness of the main body 1040 is preferably within a suitable range, namely ($\frac{1}{10}$ to $\frac{2}{3}$), to ensure a desirable overall performance.

In adopting the foregoing two bonding approaches, if there is excessive shaking or impact, the welded joint between the compound portion 1042 and the connection section 1000 alone may not be able to maintain a secure connection between the first electrode column 100 and the first connection block 104. In one embodiment, in order to enhance the strength of the joint between the first electrode column 100 and the first connection block 104, the connection section 1000 is further rivetedly connected with the first connection hole 1042*a*, or with the second connection hole 1040*a*. This approach of rivetedly connecting the connection section 1000 to the first connection hole 1042*a* may be utilized using conventional techniques in the first bonding approach. In the second bonding approach, since the compound portion 1042 does not extend through the entire thickness of the main body 1040, the compound portion 1042 may be relatively thin for the riveting process. In addition, it may be difficult to carry out the riveting process and the welding process at the same time.

In order to facilitate the riveting connection, the first connection hole 1042*a* and the second connection hole 1040*a* may be in a structure featuring a larger top portion and a smaller lower portion. In addition, the riveting connection may be aided by certain slope structure and step surface structure. In this embodiment of the present application, in order to improve the strength of the riveting connection, preferably, a circle of step portion 1040*b* is further provided within the first connection hole 1042*a* or within the second connection hole 1040*a*. The first electrode column 100 is engaged tightly with the step portion 1040*b*, thus reducing the relative moving room therein between. When the connection section 1000 is rivetedly connected with the second connection hole 1040*a* with the aid of the step portion 1040*b*, a riveting force may be directed downward. The downward riveting force tightly couples the connection section 1000 to the step portion 1040*b*. The riveting force prevents the bonding surface between the main body 1040 and the compound portion 1042 from weakening or fracturing due to an external force. For example, the bonding surface between the main body 1040 and the compound portion 1042 may not weaken even when subjected to long term shearing force from the bare battery core moving in the vertical direction, or from other shaking or impacting force, thus preventing fluctuations in the contact electrical resistance on the transition interface between the two different materials. After finishing the riveting process, the top surface of the connection section 1000 may protrude from the first connection hole 1042*a*. Next, a welding operation may be further carried out to further enhance the secure connection between the first connection block 104 and the first electrode column 100, and thus reducing the probability of occurrence of fluctuation in the contact electrical resistance.

In order to improve the welding efficiency, as well as to facilitate the riveting operation, preferably, the diameter of the top portion of the second connection hole 1040*a* and the diameter of the first connection hole 1042*a* may be equal. In this way, the connection section 1000 may extend into the first connection hole 1042*a* prior to the riveting operation, which may facilitate the following riveting operation. After finishing the riveting process, the periphery of the connection section 1000 is welded onto the inner wall of the first connection hole 1042*a*, thus using the riveting connection to further enhance the welding strength.

The welding operation may generate some welding gap and welding dross, which may compromise the flatness of the upper surface of the first connection block 104. In order to avoid the foregoing problem, after the bonding process of the first connection block 104, preferably, the upper surface of the compound portion 1042 is lower than the upper surface of the main body 1040 to reserve some room for receiving the welding gap and welding dross, while the upper surface of the main body 1040 remains flat. In addition, the top surface of the connection section 1000 is preferably flush with the upper surface of the compound portion 1042. Such topology not only improves the welding efficiency and reduces welding difficulty, but also effectively ensures that the welding gap and welding dross do not exceed the upper surface of the main body 1040.

As for the second electrode assembly 12, as shown in FIGS. 2 and 3, the second seal member 122 and the second lower insulation member 128 are disposed between the second electrode column 120 and the lower surface of the top cap piece 14. The second upper insulation member 126 is disposed between the second connection block 124 and the upper surface of the top cap piece 14. The top portion of the second electrode column 120 passes through the second seal member 122, the top cap piece 14 and the second upper insulation member 126, and then is connected with the second connection block 124 by a riveting process, a welding process, or other processes, thus tightly securing the second connection block 124, the second upper insulation member 126, the second seal member 122, and the second lower insulation member 128 to one another.

The foregoing is an embodiment of the present application in which the first electrode assembly 10 is connected to the positive electrode, the second electrode assembly 12 is connected to the negative electrode, and the busbar thereof uses copper as the base metal.

In an embodiment in which the busbar uses aluminum as the base metal, the first electrode assembly 10 is connected to the negative electrode, and the second electrode assembly 12 is connected to the positive electrode. That is, a copper aluminum transition is achieved through the negative electrode of the power battery. More specifically, in this embodiment, the base metals of the first electrode column 100, the main body 1040 and the compound portion 1042 are switched from those of the previous embodiment. Thus, the base metal of the first electrode column 100 and the compound portion 1042 is copper, while the base metal of the main body 1040 is aluminum. The connection structures of the various components are the same as those disclosed in the previously described embodiment of the present application, which will not be repeated herein.

The power battery top cap structure, the power battery and the battery module provided in the embodiments of the present application may effectively avoid the fluctuations in the contact electrical resistance on the transition interface between two different materials caused by shaking, impacting and other external factors.

Described above are exemplary embodiment of the present applications, and the disclosed embodiments are not intended to limit the present application. To a person of ordinary skill in the art, the present application may have various changes and modifications. Any modification, replacement or improvement based on the present application shall be encompassed within the scope of the present application.

What is claimed is:

1. A power battery top cap structure, comprising:
   a top cap piece; and
   a first electrode assembly comprising a first electrode column and a first connection block, wherein a top portion of the first electrode column comprises a connection section, wherein the first connection block comprises a main body and a compound portion, a material forming the main body comprises a first base metal, both a material forming the first electrode column and a material forming the compound portion comprise a second base metal, wherein the first base metal is different from the second base metal, wherein the compound portion is bonded with the main body, wherein the compound portion comprises a first connection hole, wherein the first connection block is disposed above the top cap piece, wherein the connection section and the compound portion are welded together, wherein an upper surface of the main body comprises a recessive portion, and the compound portion is inserted within the recessive portion, wherein the main body further comprises a second connection hole, wherein the connection section passes through the top cap piece, the second connection hole, and the first connection hole, and wherein the connection section is rivetedly connected to the second connection hole.

2. The power battery top cap structure according to claim 1, wherein the second connection hole comprises a step portion, and the first electrode column is engaged with the step portion.

3. The power battery top cap structure according to claim 1, wherein a diameter of a top portion of the second connection hole is equal to a diameter of the first connection hole, and a periphery of the connection section is welded to the inner wall of the first connection hole.

4. The power battery top cap structure according to claim 1, wherein a ratio of a thickness of the compound portion to a thickness of the main body ranges from 1/10 to 2/3.

5. The power battery top cap structure according to claim 1, wherein an upper surface of the compound portion is lower than an upper surface of the main body.

6. The power battery top cap structure according to claim 5, wherein a top surface of the connection section is flush with the upper surface of the compound portion.

7. The power battery top cap structure according to claim 1, wherein the compound portion extends along a direction of a width of the top cap piece, and extends through a thickness of the main body.

8. The power battery top cap structure according to claim 1, wherein the material forming the main body comprises aluminum or an aluminum alloy, the material forming the first electrode column comprises copper or a copper alloy, and the material forming the compound portion comprises copper or a copper alloy.

9. The power battery top cap structure according to claim 1, wherein the material forming the main body comprises copper or a copper alloy, the material forming the first electrode column comprises aluminum or an aluminum alloy, and the material forming the compound portion comprises aluminum or an aluminum alloy.

10. The power battery top cap structure according to claim 1, wherein the connection section and the compound portion are connected via laser welding.

11. The power battery top cap structure according to claim 1, wherein the main body and the compound portion are bonded together by at least one of a cold rolling process, a hot rolling process, an explosive compound process and an explosive rolling process.

12. The power battery top cap structure according to claim 1, further comprising:
    a second electrode assembly that is attached to the top cap piece.

13. A power battery, comprising:
    a battery core within a shell body; and
    a power battery top cap structure on a top portion of the shell body, the power battery top cap structure comprising:
      a top cap piece; and
      a first electrode assembly comprising a first electrode column and a first connection block, wherein a top portion of the first electrode column comprises a connection section, wherein the first connection block comprises a main body and a compound portion, a material forming the main body comprises a first base metal, both a material forming the first electrode column and a material forming the compound portion comprise a second base metal, wherein the first base metal is different from the second base metal, wherein the compound portion is bonded with the main body, wherein the compound portion comprises a first connection hole, wherein the first connection block is disposed above the top cap piece, wherein the connection section and the compound portion are welded together, wherein an upper surface of the main body comprises a recessive portion, and the compound portion is inserted within the recessive portion, wherein the main body further comprises a second connection hole, wherein the connection section passes through the top cap piece, the second connection hole, and the first connection hole, and wherein the connection section is rivetedly connected to the second connection hole.

14. The power battery according to claim 13, further comprising:
    a second electrode assembly that is attached to the top cap piece.

15. A battery module, comprising:
    a busbar; and a power battery connected to the busbar, the power battery including a power battery top cap structure on a top portion of the power battery, the power battery top cap structure comprising:
  a top cap piece; and
  a first electrode assembly comprising a first electrode column and a first connection block, wherein a top portion of the first electrode column comprises a connection section, wherein the first connection block comprises a main body and a compound portion, a material forming the main body comprises a first base metal, both a material forming the first electrode column and a material forming the compound portion comprise a second base metal, wherein the first base metal is different from the second base metal, wherein the compound portion is bonded with the main body, wherein the compound portion comprises a first connection hole, wherein the first connection block is disposed above the top cap piece, wherein the connection section and the compound portion are welded together, wherein an upper surface of the main body comprises a recessive portion, and the compound portion is inserted within the recessive portion, wherein the main body further comprises a second connection hole, wherein the connection section passes through the top cap piece, the second connection hole, and the first connection hole, and wherein the connection section is rivetedly connected to the second connection hole,
  wherein the busbar is welded to the main body, and wherein both a material forming the busbar and the material forming the main body comprise the first base metal.

16. The battery module according to claim 15, further comprising:
  a second electrode assembly that is attached to the top cap piece.

* * * * *